Oct. 6, 1964      E. H. ROBERTS      3,152,199

METHOD OF MANUFACTURING INSULATED REFRIGERATOR CABINETS

Filed Oct. 23, 1961      2 Sheets-Sheet 1

INVENTOR.
EDWARD H. ROBERTS

BY *Walter E. Kule*

HIS ATTORNEY

Oct. 6, 1964     E. H. ROBERTS     3,152,199
METHOD OF MANUFACTURING INSULATED REFRIGERATOR CABINETS
Filed Oct. 23, 1961
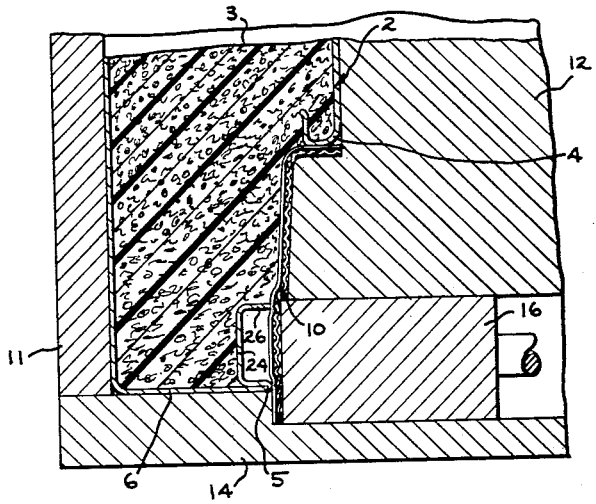
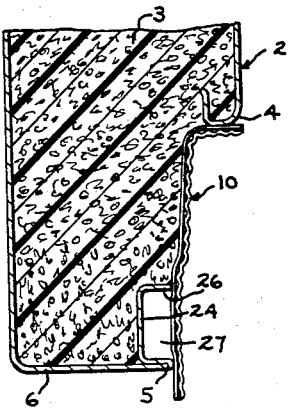
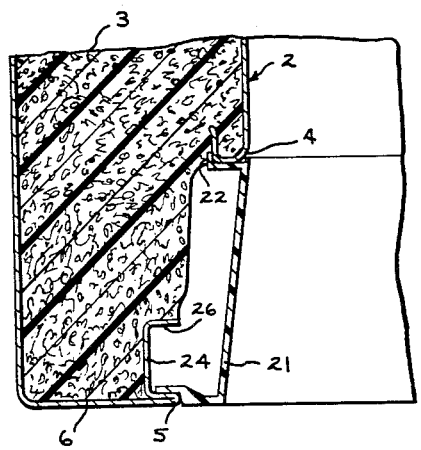
INVENTOR.
EDWARD H. ROBERTS
BY Walter E. Kule
HIS ATTORNEY United States Patent Office 3,152,199
Patented Oct. 6, 1964

3,152,199
METHOD OF MANUFACTURING INSULATED
REFRIGERATOR CABINETS
Edward H. Roberts, Jeffersontown, Ky., assignor to
General Electric Company, a corporation of New York
Filed Oct. 23, 1961, Ser. No. 146,942
3 Claims. (Cl. 264—45)

The present invention relates to refrigerator cabinets and is more particularly concerned with improved method of manufacturing a cabinet including plastic foam insulation in the walls thereof.

Certain types of foamed polyurethane resins have insulating and other characteristics which make them particularly useful for insulating the walls of refrigerator cabinets and the like. These refrigerators normally comprise one or more liners forming food storage compartments contained within and spaced from a shell or outer wall structure and the space between the liners and the shell is filled with the insulating foam. The exposed surfaces of the liners and the shell are, in accordance with the usual practice, provided with protective and decorative coatings of an inorganic or organic enamel. Due to the fact that the baking or curing temperatures for the enamel layer or layers are higher than the melting or softening point of the foam insulation, refrigerator cabinets, in which the foam insulation is formed in place so that by adherence to the shell and liner surfaces it will provide additional strength to the cabinet structure, are normally manufactured by applying the enamel coatings to the shell and liner, assembling the coated shell and liner components in their final spaced relationship and then introducing into the spaces requiring insulation, a foamable liquid polyurethane resin which expands to fill the entire space and sets to form a rigid foam structure.

One problem confronted in the manufacture of cabinets of this type involves the sealing of the space between the forward edges of the liner or liners and the face portion of the outer cabinet walls or shell during the foaming operation in order to prevent liquid resin or foam from flowing onto the finished cabinet surfaces. Ordinarily, during the foaming operation, the cabinet components are contained within a suitable mold capable of withstanding the pressures generated by the foam formation and a portion of that mold bridges these spaces to contain the foam in this area. For the economical production of foam insulated cabinets, it is desirable that the foamed cabinet be removed from the mold or equivalent fixture while the foam is still in a tacky stage that is before it is completely hardened. Common mold release materials will not allow the foam to separate from the mold surfaces in such a short time. A number of separating layers or films have been proposed to solve this problem. For example, polyethylene films have been used in some cases but these puncture readily and are difficult to handle in actual production. Furthermore, due to manufacturing variations in the surfaces of the cabinet parts adjacent at the breaker strip area, thin films such as polyethylene films cannot always be relied upon to completely seal these areas against leakage of the liquid foam producing material or the flowable foam during the foaming process and any foam leaking onto the organic enameled surfaces cannot be removed without damaging the appearance thereof.

The present invention has as its primary object the provision of an improved method of foam insulating a refrigerator cabinet or the like involving the use of a sealing means which is adapted to effectively and completely seal the breaker strip area of the cabinet during the foaming operation and which permits quick removal of the foamed cabinet from the mold after the foaming operation has been completed.

Another object of the invention is to provide an improved low cost method of manufacturing a foam insulated cabinet employing an easy to handle, compressible sealing member for sealing the space between the liner and the cabinet shell during the foaming operation and which is readily removable after the foaming has been completed.

Further objects and advantages of the present invention will become apparent as the following description proceeds and the features of novelty which characterize the invention will be pointed out with particularity in the claims annexed to and forming a part of this specification.

In accordance with the present invention, there is provided an improved method of manufacturing a foam insulated cabinet which comprises positioning the cabinet liner or liners and the shell in spaced relationship with one another, pressing into engagement with the edges of the shell and liner defining the access opening to the cabinet a sealing means which bridges the space between the edges and which comprises a flexible, single face corrugated paper member formed so that the corrugations extend parallel to the liner and shell edges with the flat or uncorrugated side of the paper in engagement with those edges. Pressure applied to the corrugated side of this sealing means causes the flat face or side of the sealing means to form a firm continuous engagement with the edges of the shell and liner so that when a foamable liquid resin is thereafter introduced into the space between the shell and the liner, no leakage of the liquid or foamed resin can take place in the areas adjacent the shell and liner edges.

For a better understanding of the invention reference may be had to the accompanying drawing in which:

FIGURE 3 is a sectional view similar to FIGURE 2 illustrating one step in the foaming operation of the present invention;

FIGURE 4 is a sectional view of a portion of the insulated cabinet subsequent to the foaming operation; and FIGURE 5 is a view of the cabinet after foaming with the breaker strip in its final assembled position bridging the space between the cabinet shell and liner.

Figure 1:
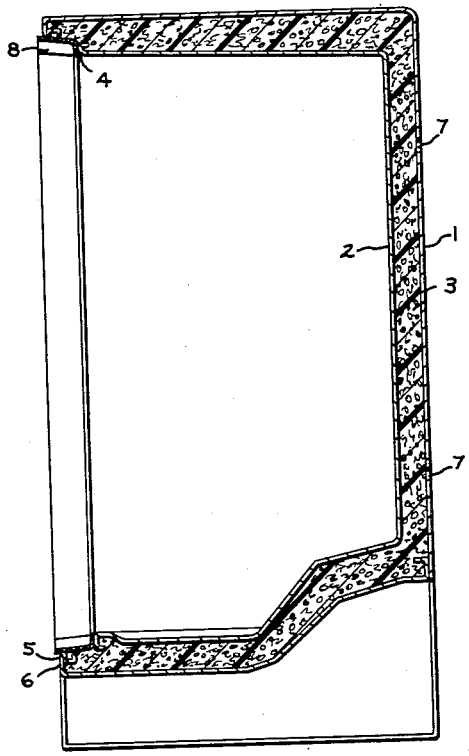
FIGURE 1 is a side elevational view, in section, of a refrigerator cabinet manufactured in accordance with the present invention.

With reference to FIGURE 1 of the drawing there is shown, somewhat schematically, a refrigerator cabinet or the like including a shell or outer wall structure 1 and a liner 2 spaced from the outer shell and defining a storage compartment within the refrigerator cabinet having an open front side forming the access opening to the compartment. The space between the shell 1 and liner 2 is filled with a foamed resin insulating material such as a foamed polyurethane. As is common with refrigerator cabinets of this type, the forward of front edge 4 of the liner is spaced from the adjacent portions of the shell 1 or more specifically from the inner edges 5 of the flange 6 defining the access opening in the outer shell and this space is normally bridged by means of a plastic or other low heat conductivity breaker strip.

In the manufacture of a foam insulated cabinet of this type, the inner surface of the liner 2 and the outer surfaces of the shell 1, that is the exposed surface thereof, are first provided with protective or decorative finishes of an organic or inorganic enamel. These two components are then assembled in a suitable mold or fixture designed to maintain them in their final spaced relationship after which a foamable liquid resin such as a polyurethane resin is introduced as a liquid into the space between the shell and liner through one or more openings such as the openings 7 in the rear wall of the shell 1. The liquid resin is then allowed to foam and cure under a generated pressure of a few pounds per square inch in order to provide a foam structure having the maximum insulating properties. Due to the pressures developed during the foaming, both the liquid resin material shortly after its introduction as well as the still molten or plastic foam material tends to flow out of the space between the shell and liner through any unsealed openings and, because of the properties thereof, any of this material coming in contact, for example, with the exposed surfaces of the flange 6 on the face of the cabinet cannot be removed without damaging the surface finish. It is therefore essential that there be provided means for sealing particularly the space between the forward edge of the liner 4 and the inner edge 5 of the flange 6 to prevent any leakage of the foam material in these areas.

The present invention is based on the discovery that a single-faced flexible corrugated paper member provides an effective seal for bridging the space between the liner and shell edges during the foaming operation. This sealing element indicated by the numeral 10 in FIGURE 1 of the drawing is shown in cross-section in FIGURES 2, 3 and 4 of the drawing. It comprises strips of single-face corrugated paper formed to the shape of the access opening. Since this opening is normally rectangular, four strips of the corrugated paper of suitable length are formed into a rectangular structure as shown in FIGURE 1 and the strips after being bent to the proper configuration for bridging the space between the liner and shell edges 4 and 5 are joined by means of a plastic tape 8 at the corners of the sealing member. The sealing member is so constructed that the flat or uncorrugated paper will be in contact with the liner and shell edges during the foaming operation.

Figure 2:
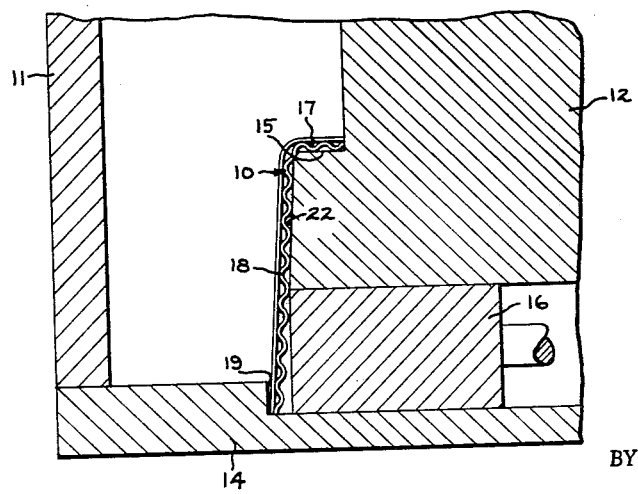
FIGURE 2 is a section of a portion of a mold or fixture employed in the practice of the present invention.

The sealing member 10 is then positioned within a mold or fixture adapted to position the liner and shell relative to one another during the foaming operation. The essential elements of a mold required for the practice of the present invention are illustrated in FIGURES 2 and 3 of the drawing. In addition to the illustrated elements, the mold comprises an outer box-like wall structure 11 for supporting the entire side and end walls of the shell during the foaming operation and a liner supporting member 12 centrally positioned within the mold. This member 12 has the same shape as the interior of the liner 2 and is adapted to support the liner walls during the foaming operation. In addition to the bottom wall or platform 14, it will be understood that the mold also includes a removable top wall or lid for supporting the back wall of the shell against foaming pressures.

For the practice of the present invention, the member 12 is provided with a horizontal ledge or shoulder portion 15 on its four sides adapted to support the forward edge 4 of the liner when it is positioned face down within the mold. Also, at the lower portion of the member 12, there is provided on the four sides thereof a movable member 16 and suitable drive means (not shown) for moving these members horizontally between a withdrawn or retracted position and an extended position in which they substantially engage the adjacent portions of edge 5 of the shell flange 6.

Before placing the liner and shell in the mold the sealing member 10 formed to include a first portion 17 adapted to rest on the ledge 15 a second portion 18 adapted to extend downwardly along the outer surface of the member 12 and in front of the movable member 16 in the base 14 opposite the member 16 and spaced from is positioned within the mold. A shoulder 19 provided member 12 is employed to position the lower portion of the sealing member in the mold.

After the sealing member 10 is placed in the mold with the corrugated side facing the liner supporting member 12, the liner, as shown in FIGURE 3 of the drawing, is placed over the member 12 which serves to position the liner relative to the shell and the shell is then slipped downwardly over the liner. The face flange 6 rests on the bottom wall 14 of the mold and the outer walls 11 serve to position the shell relative to the liner. As the shell is being placed in the mold the movable members 16 which are provided on each of the four sides of the member 12 are in the retracted position. After the shell is put in position these members are moved to their forward positions so that they clamp the adjacent portions of the sealing member 10 into engagement with the edge 5 of the flange 6 to provide a fluid tight seal. In those cases where the weight of the liner 2 is not sufficient to provide a similar seal between the edge 4 of the liner and the shoulder or ledge 15, addition means may be provided for applying the necessary pressure to the liner. The lid or cover for the mold is then placed in position and a foamable resin is introduced into the space between the shell and the liner through the holes 7 and corresponding openings in the lid. The foamable resin is introduced in an amount sufficient that upon foaming and setting, it completely fills the spaces requiring the presence of such insulation.

As soon as the foam has set to a point where the foam structure can be removed from the mold, the mold is opened and the shell and liner which are then bonded together by means of the expanded resin foam are removed as a unit from the mold. As illustrated in FIGURE 4 of the drawing, the sealing member 10 which adheres to the foam 3 then forms part of the foamed structure. It is thereafter removed in whole or in part in order to expose the edge 5 of the flange 6 and those portions of the liner edge 4 employed to support a breaker strip 21 as illustrated in FIGURE 5 of the drawing.

The primary purpose of the corrugations 22 forming one surface of the sealing member 10 are to compensate for any variations in the liner and shell edges. These corrugations, which are resilient, serve to more or less uniformly distribute the pressure exerted by the ledges 15 and the movable member 16 over relatively wide areas of the sealing member so that those portions of the sealing member in direct contact with the edges 4 and 5 will be pressed into firm and leakproof engagement therewith. To this end and also to permit easy removal of the sealing member after the foaming operation, the corrugations should extend parallel to the edges 4 and 5 rather than transversely. It has also been found that a single-face, bleached craft corrugated paper of the type used by the food preparation industry provides the best overall seal during the foaming operation. Preferably the paper contains about 4 corrugations per inch and is within the 35 to 55 pound range for both the corrugated component and the uncorrugated layer. A single-face corrugated sheet has been found essential for the proper compression or partial collapsing of the corrugations as it is pressed into engagement with the liner and shell edges. If desired, of course, the paper and particularly the flat side thereof may be provided with a wax coating or a polyethylene coating to provide for a more easy removal of the sealing member from the foam.

In the preferred embodiment of the invention as illustrated in the drawing, the shell 1 is shaped to provide a foam free area adjacent the flange edge 5 for receiving the breaker strip 21. To this end, the material of the outer shell adjacent the edge 5 is bent back upon itself and then rearwardly and inwardly to provide a rearwardly extending portion 24 and a second inwardly extending flange portion 26 in the same plane as the edge 5 and therefore in a position to be contacted by the sealing member 10 as it is pressed into engagement therewith by the movable member 16. Thus the principal seal is obtained between the edge of the portion 26 and the sealing member 10 leaving the area 27 between the inner flange 26 and the outer flange 6 free of foam. In addition the use of the double flange contact correspondingly increases the protection against leakage of foam between the sealing member 10 and the outer shell 2. If necessary a small portion of the foam can be removed along the edge 4 to provide a space for the inner edge 22 of the breaker strip.

While there has been shown and described a particular embodiment of the present invention, it will be understood that the invention is not limited thereto and it is therefore intended by the appended claims to cover all modifications that fall within the spirit and scope of the invention.

What I claim as new and desire to secure by Letters Patent of the United States is:

1. The method of making a plastic foam insulated cabinet comprising a liner having a front edge defining an access opening, an outer shell spaced from said liner and including an inwardly extending flange having an inner edge defining an access opening, and plastic foam insulation formed in place in the space between said liner and shell; said method comprising positioning said liner relative to said shell with the edge of said liner in spaced relationship with the inner edge of said flange, pressing into engagement with both of said edges a sealing means bridging the space between said edges, said sealing means comprising a flexible single-face corrugated paper formed so that the corrugations extend parallel to said edges and arranged so that the flat side of said paper engages said edges, and introducing into the space between said shell and liner a foam forming liquid plastic material adapted to foam and fill the entire space between said liner and said shell.

2. The method of making a plastic foam insulated cabinet comprising a liner having a front edge defining an access opening, an outer shell spaced from said liner, an edge defining an access opening, and a plastic foam insulation extending throughout the space between said liner and shell; said method comprising positioning said liner relative to said shell with the edge of said liner in spaced relationship with the edge of said flange, pressing into engagement with both of said edges a sealing means adapted to gridge the space between said edges and comprising a flexible single-face corrugated paper formed so that the corrugations extend parallel to said edges and the flat side of said paper engages said edges, and thereafter introducing into the space between said shell and liner a liquid foam forming liquid plastic material, the flexibility of said corrugation maintaining said flat side of said paper in sealing engagement with said edges during foaming of said plastic material.

3. The method of making a plastic foam insulated cabinet comprising a liner having a front edge defining an access opening, an outer shell spaced from said liner and including an inwardly extending flange having an inner edge defining an access opening and a plastic foam insulation extending throughout the space between said liner and shell, said method of comprising the steps of providing a supporting means for supporting on their respective edges, the liner relative to said shell with the front edge of said liner in spaced relationship with the edge of said flange, interposing between said supporting means and said edges a sealing means bridging the space between said edges, said sealing means comprising a flexible compressible, single-face corrugated paper formed so that the corrugations extend parallel to said edges and the flat side of said paper engages said edges and maintained in sealing engagement with said edges by compression of said corrugations, and introducing into the space between said shell and liner a foam forming liquid plastic material.

References Cited in the file of this patent

UNITED STATES PATENTS

| | | |
|---|---|---|
| 1,739,231 | Holdsworth | Dec. 10, 1929 |
| 2,106,840 | Gould | Feb. 1, 1938 |
| 2,552,641 | Morrison | May 15, 1951 |
| 2,659,124 | Henry | Nov. 17, 1953 |
| 2,941,570 | Plym | June 21, 1960 |
| 2,958,210 | Rill | Nov. 1, 1960 |
| 2,962,183 | Rill et al. | Nov. 29, 1960 |
| 3,000,058 | Thielen | Sept. 19, 1961 |
| 3,083,665 | Steidley | Apr. 2, 1963 |

OTHER REFERENCES

Modern Plastics, "Urethane Foam Brings Back the Gas Refrigerator," volume 38, No. 8, April 1961, pages 96–98.